(12) United States Patent
Createman

(10) Patent No.: US 8,382,434 B2
(45) Date of Patent: Feb. 26, 2013

(54) FLUID-PROPELLING DEVICE HAVING COLLAPSIBLE COUNTER-ROTATING IMPELLERS

(76) Inventor: Phillip Createman, Vista, CA (US)

( * ) Notice: Subject to any disclaimer, the term of this patent is extended or adjusted under 35 U.S.C. 154(b) by 576 days.

(21) Appl. No.: 12/688,786

(22) Filed: Jan. 15, 2010

(65) Prior Publication Data

US 2011/0033295 A1 Feb. 10, 2011

Related U.S. Application Data

(63) Continuation-in-part of application No. 12/440,915, filed as application No. PCT/US2007/019816 on Sep. 11, 2007, now abandoned, which is a continuation-in-part of application No. 11/518,966, filed on Sep. 11, 2006, now abandoned.

(51) Int. Cl.
*F01D 1/24* (2006.01)
(52) U.S. Cl. ............... 416/120; 416/142; 416/170 R
(58) Field of Classification Search .............. 416/69, 416/78, 4, 26, 122, 130, 132 R, 132 A, 135, 416/142, 143, 55, 54, 75, 71, 120, 121; 244/10, 244/9, 199.1, 64, 73 C
See application file for complete search history.

(56) References Cited

U.S. PATENT DOCUMENTS

| | | | | | |
|---|---|---|---|---|---|
| 1,532,902 | A | * | 4/1925 | Immers | 244/9 |
| 2,107,808 | A | * | 2/1938 | Van Ittersum | 244/153 A |
| 2,151,349 | A | * | 3/1939 | Fromme | 244/153 A |
| 2,657,022 | A | * | 10/1953 | Spiess, Jr. | 366/300 |
| 2,985,406 | A | * | 5/1961 | Bump | 244/10 |
| 5,954,295 | A | * | 9/1999 | Olson | 244/9 |
| 6,711,996 | B1 | * | 3/2004 | Mackie | 100/169 |
| 7,461,811 | B2 | * | 12/2008 | Milde, Jr. | 244/9 |
| 2002/0044805 | A1 | * | 4/2002 | Hasegawa | 399/325 |
| 2005/0274843 | A1 | * | 12/2005 | Schwaiger | 244/21 |

FOREIGN PATENT DOCUMENTS

JP 63075318 A * 4/1988

* cited by examiner

*Primary Examiner* — Edward Look
*Assistant Examiner* — Aaron Jagoda
(74) *Attorney, Agent, or Firm* — Charmasson, Buchaca & Leach, LLP

(57) ABSTRACT

A counter-rotating fluid-propelling apparatus uses an oblong drive mechanism being oriented substantially orthogonal to the axes of rotation of a pair of counter-rotating impellers and which temporarily and simultaneously engages the edges of the impellers while they are in substantial contact. Each impellers can include a number of substantially rectangular planar panels, hingedly connected to one another along common edges to vertices. Each impeller has an axis of rotation that passes lengthwise through the middle of the impeller such that the axis is parallel to and equidistant from the panel edges. The impellers counter-rotate and remain in constant contact with respect to one another. During each revolution of the impellers, each of the panels of one impeller contacts its counterpart on the other impeller so that planar panels meet flat surface to flat surface and vertex to vertex. The impellers collapse so that constant contact is maintained. A paddled drive belt successively engages drive pins extending from the vertices and pushes them in order to drive the impellers.

19 Claims, 5 Drawing Sheets

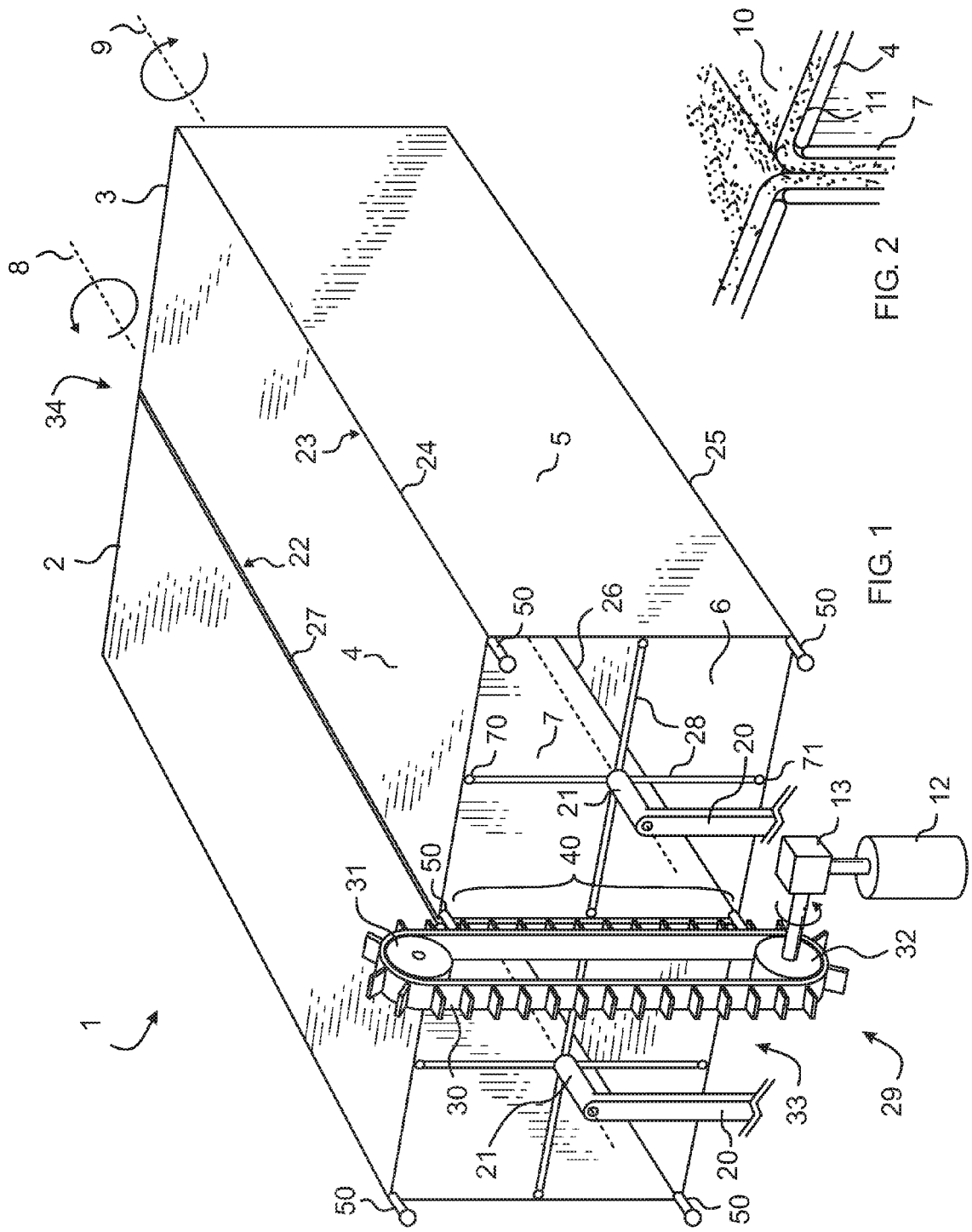

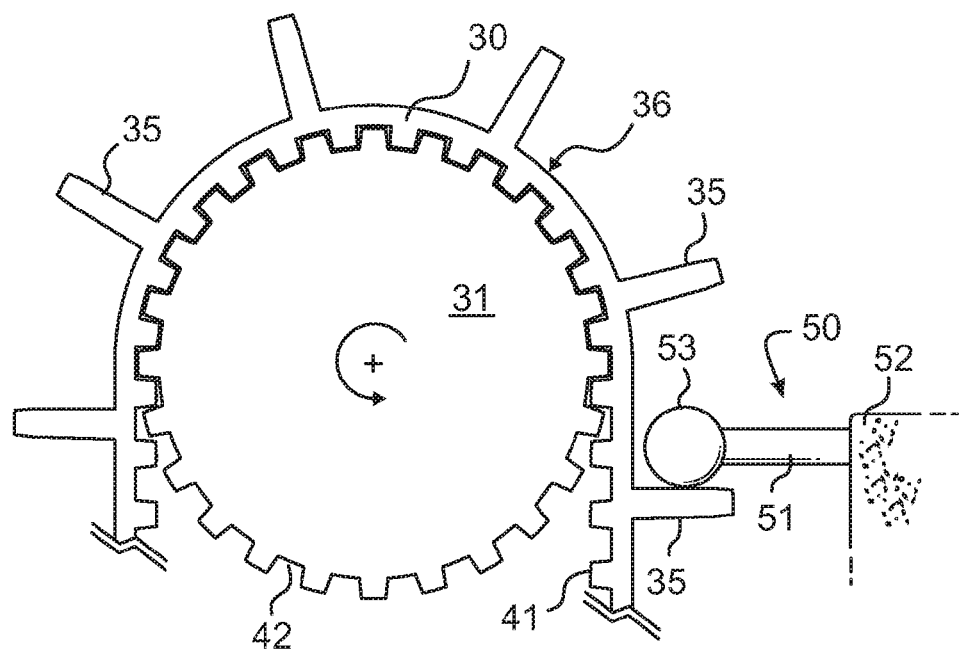
FIG. 3
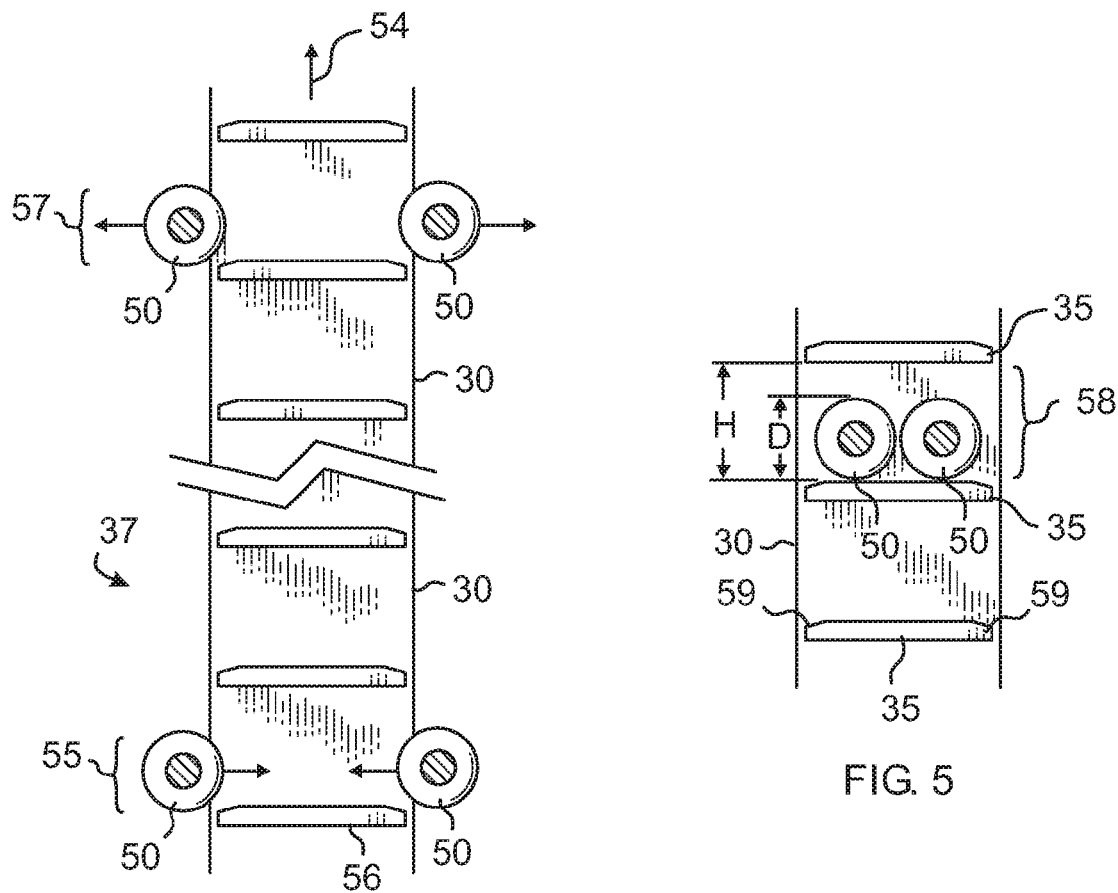
FIG. 4
FIG. 5

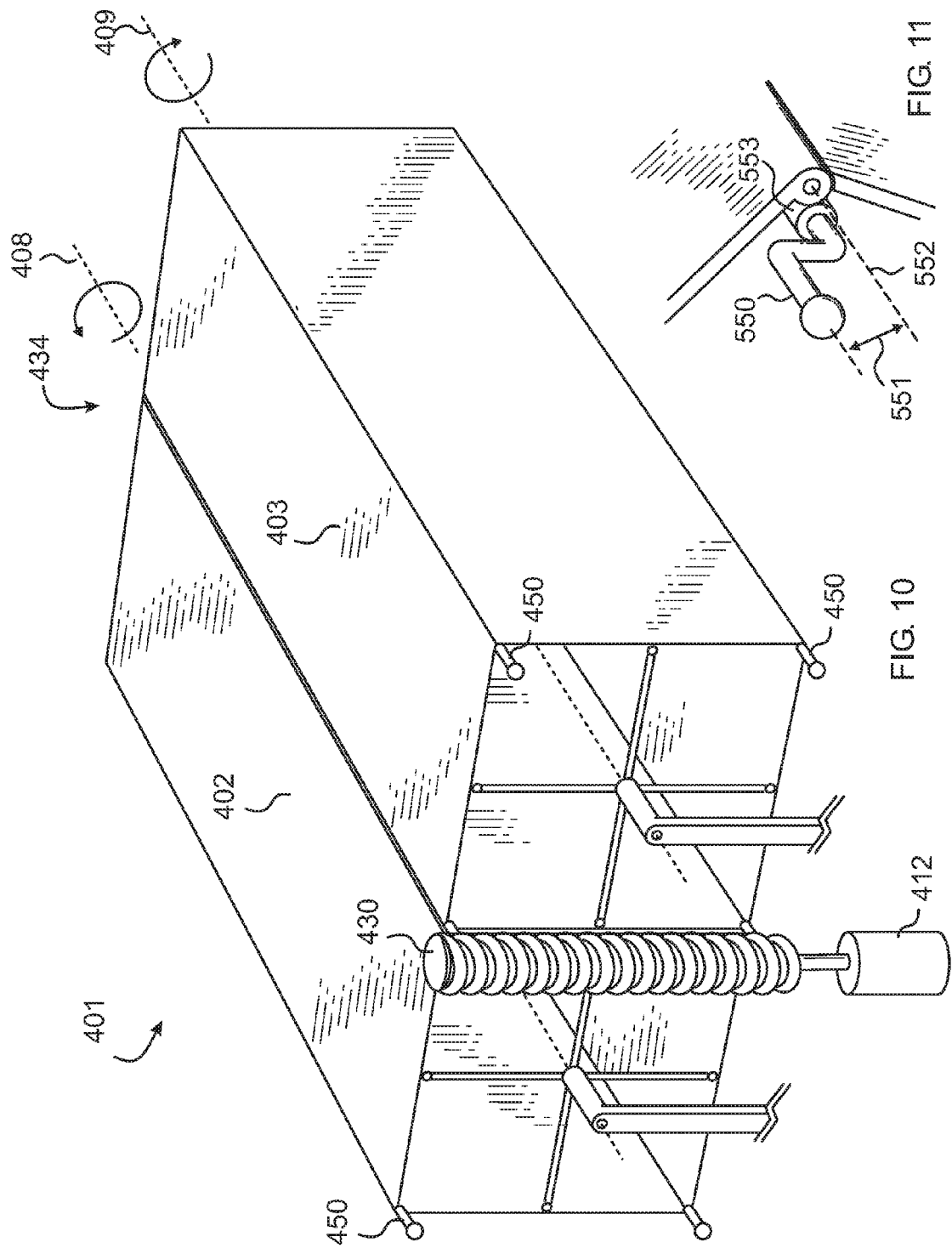

FLUID-PROPELLING DEVICE HAVING COLLAPSIBLE COUNTER-ROTATING IMPELLERS

PRIOR APPLICATION

This is a continuation-in-part of U.S. patent application Ser. No. 12/440,915 filed Mar. 11, 2009, which is a 371 of International Application PCT/US07/19816, having an international filing date of Sep. 11, 2007 which is a continuation-in-part of U.S. patent application Ser. No. 11/518,966 filed Sep. 11, 2006.

FIELD OF THE INVENTION

This invention relates to propellers, impellers, fans, turbines, and the like, and educational devices related to the same which propel a fluid such as a gas or liquid. More specifically, though not exclusively, the present invention relates to a counter-rotating air propelling apparatus that can be used in a flying vehicle akin to a helicopter, in place of the rotor blades. The apparatus can also be used as a turbine to generate electricity, as an impeller on boats, ships and submarines, as a pumping device, fan or compressor used for example in vacuum cleaners, air conditioners, jet engines, hydroturbines, quadrangular cross-section conduits, miniature flying devices and toys.

BACKGROUND

Various types of fluid propelling apparatuses exist. Some include reciprocating impeller panels such as the device disclosed in Smith et al., U.S. Pat. No. 1,057,891 and counter-rotating impeller panels such as the device disclosed in Immers, U.S. Pat. No. 1,532,902.

These prior devices suffer from fluid leakage between and surrounding the impeller panels, thus robbing the device of efficiency.

I propose in my U.S. patent application Ser. No. 11/518,966 filed Sep. 11, 2006 and published under U.S. Patent Application Publication No. 2008-0078860; and in my International Application No. PCT/US07/19816 filed Sep. 11, 2007 designating the U.S. and published under International Publication No. WO-2008-033398 both of which are incorporated herein by this reference, devices having counter-rotating impeller panels which remain in contact with one another during their entire rotation cycle and thus reduce leakage between the impellers.

Some potential problems with these devices include the vibrational effects of the moving lever arms, fluid leakage between contacting surfaces, and certain difficulties in maintaining synchronization between the counter rotating bodies and their drive mechanisms.

Impellers such as rotating fan blades must often rotate at high speeds in order move a given volume of fluid. Such high speed rotations can cause localized pressure variations which can adversely affect the ambient fluid or other materials suspended in the fluid. For example, high speed propellers in water craft can cause efficiency-robbing and noisy cavitations. Biological fluid samples containing sensitive chemical or biological structures can be damaged by the high speed movement of an impeller for mixing or transport.

Some existing conduits such as air conditioning conduits for large buildings or mine shafts may have rectangular, trapezoidal or other uncommon polygonal shapes that are not easily modified. It can be difficult to adapt such conduits to fans or other high speed impellers having a circular shape for moving fluid through the conduit.

The invention results from attempts to address some of the above identified problems.

SUMMARY

The principal and secondary objects of the present invention are to provide a fluid propelling apparatus which reduces fluid leakage between counter-rotating impellers.

These and other objects are achieved by an apparatus wherein counter-rotating impeller bodies remain in contact with one another during a rotation cycle.

In some embodiments the impeller bodies are driven by an oblong drive mechanism which repeatedly and continuously engages and moves linearly the vertices of the impellers as they come together and disengages from them as they come apart.

It is a further object of the invention to provide an apparatus to educate users to the aerodynamic properties of counter-rotating impeller bodies.

In some embodiments there is provided a fluid propelling apparatus which comprises: a pair of counter-rotating impeller bodies; wherein each of said bodies has an outer surface exposed to an amount of ambient fluid; wherein the outer surface of a first of said bodies remains in constant contact with the outer surface of the other of said bodies during a complete rotation cycle.

In some embodiments each of said bodies repeatedly collapses and expands during said cycle. In some embodiments a first of said bodies rotates about a first axis; a second of said bodies rotates about a second axis fixedly spaced apart from said first axis. In some embodiments said first axis and second axis are oriented to be substantially coplanar. In some embodiments said first axis and second axis are oriented to be substantially parallel. In some embodiments each of said bodies comprises: a plurality of substantially planar panels; wherein each of said panels is hingedly connected to an adjacent one of said panels. In some embodiments each of said bodies comprise four of said panels. In some embodiments each of said bodies successively collapses and expands during a fraction of a revolution. In some embodiments said fraction is 1 divided by the number of said panels. In some embodiments each of said bodies comprises four panels and each of said bodies successively collapses and expands during ¼ of a revolution. In some embodiments each of said panels is similarly shaped and dimensioned. In some embodiments each of said bodies further comprises: a plurality of engagements connected thereto; wherein each of said plurality of engagements is positioned to releasably engage a drive mechanism. In some embodiments each of said plurality of engagements comprises a drive pin. In some embodiments said outer surface comprises a coating layer of resiliently collapsible material.

BRIEF DESCRIPTION OF THE DRAWINGS

FIG. 1 is a diagrammatic perspective view of a fluid propelling apparatus having a pair of quadrangular collapsible/expandable counter-rotating impeller tubes driven by a vertex engaging drive belt.

FIG. 2 is a partial diagrammatic perspective view showing the resiliently compressible coating on the outer surfaces of the impeller tubes.

FIG. 3 is a partial diagrammatic side view showing the upper gear of the drive mechanism and paddled belt engaged by a drive pin.

FIG. 4 is a diagrammatic end view of the paddled drive belt showing pairs of drive pins engaging and disengaging therefrom.

FIG. 5 is a diagrammatic end view of the paddled drive belt showing a fully engaged pair of drive pins being driven by a paddle on the drive belt.

FIG. 10 is a diagrammatic perspective view of a fluid propelling apparatus having a pair of quadrangular collapsible/expandable counter-rotating impeller tubes driven by a drive screw.

FIG. 11 is a diagrammatic perspective view of an alternate embodiment offset, swivelling drive pin.

DESCRIPTION OF THE EXEMPLARY EMBODIMENTS

Figure 6:
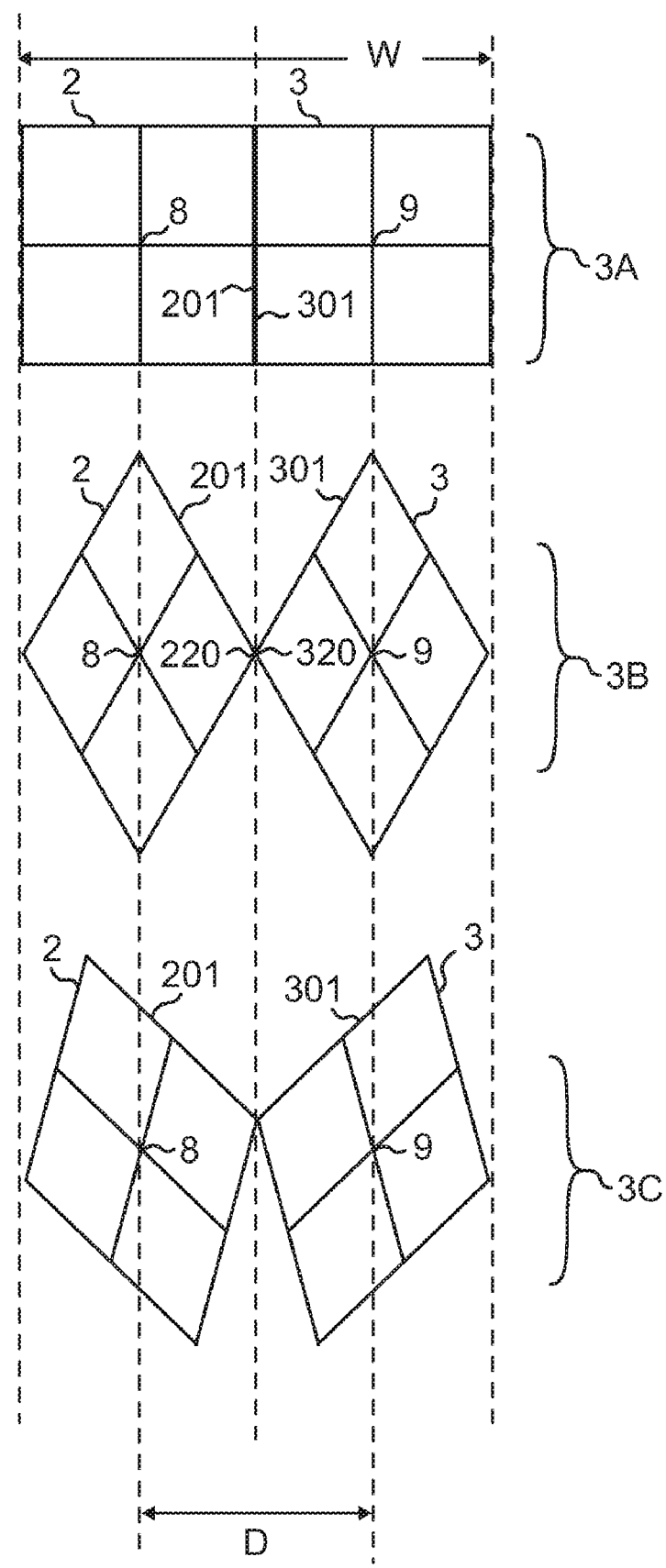
FIG. 6 are a series of progressive images showing the collapsible/expandible impeller tubes in various stages of rotation.

Although the present exemplary embodiment refers to an air-propelling flying apparatus, those skilled in the art of fluid propelling mechanisms will readily appreciate that the mechanism can be adapted to propel other fluids in other applications including those described above. Further, in this embodiment the apparatus is oriented to provide vertical lift against the force of gravity. Therefore, the mechanisms are described in reference to this vertical orientation. Those skilled in the art will readily recognize translation of the described directions for different applications and orientations.

Referring now to the drawing, there is shown in FIG. 1 a fluid propelling apparatus 1 for use in a flying vehicle where the fluid to be propelled is air. The apparatus includes a pair of substantially quadrangular, counter-rotating, collapsible/expandable impeller bodies in the form of hollow tubes 2,3 mounted side-by-side to one another. Each impeller tube 2,3 is rotatively mounted to a rigid chassis 20 at an axle 21 so that it can rotate about its own axis 8,9. The axes are fixed with respect to the chassis and are spaced apart in relation to one another. In this embodiment the axes are oriented to be coplanar and parallel and are shown to be substantially horizontal.

Referring to the right-hand impeller tube 3 in the drawing, each tube has a generally quadrangular shape formed by four substantially similarly dimensioned rectangular panels 4,5,6,7 connected along their common lateral edges to form four vertices 24,25,26,27. In other words, each individual panel (taking panel 4 for example) has a pair of lateral edges 22,23. Each lateral edge is hingedly connected to the lateral edge of an adjacent panel, so that edge 22 is hingedly connected to an edge of panel 7 and edge 23 is hingedly connected to panel 5. Each of the four panels is connected in a likewise manner to its adjacent panels.

In this embodiment a four-paneled impeller tube is preferred because a three panel tube would not allow the same type of transformation, namely collapse and expansion, and a tube having more than four panels would correspondingly reduce panel displacement and pressures during each rotation cycle.

A set of oblong, rigid bracing spokes 28 further support the shape of the impeller tubes during operation. Each spoke 28 hingedly connects at a first end to a hinge 70 located at a median portion of a panel 4, and at an opposite end to a hinge 71 located to the opposite panel 6. Further the spoke swivellingly connects to an axle 21. A similar bracing spoke connects the other panels 5,7 to each other and to the axle.

In this way, the panels can articulate with their adjacent panels to allow the impeller tube to successively and repeatedly collapse and expand during a rotation cycle as will be described in greater detail below.

As shown in FIG. 2, the outer surface 11 of each panel is coated with a layer 10 of resiliently compressible material such as plastic foam or rubber. In this way, an improved seal is made between the two impellers along their zone of contact throughout a revolution cycle. It should be noted that the layer of resilient material can be in the form of a unitary sleeve and act as the hinge at the vertices of the panels.

The tubes are driven to counter-rotate with respect to one another in a "separation-at-the-top" manner by means of a drive mechanism 29. In the embodiment of FIG. 1 the drive mechanism includes a motor 12 which through a transmission 13 drives a drive belt 30 coursing about a pair of spaced apart spindles or gears 31,32 along an interface zone 40 between the two impeller tubes where they contact each other during their revolutions. The drive mechanism is positioned at one end 33 of the tubes between the rotation axes 8,9 of the tubes. A similar drive mechanism can be located at the opposite end 34 of the tubes to enhance the apparatus balance and increase power.

The drive mechanism 29 includes a number of paddles 35 that are uniformly spaced apart along and extending from the outwardly facing surface 36 of the drive belt 30. As the belt moves, the paddles move unidirectionally through the oblong interface zone 40 which is substantially vertical in this embodiment and oriented substantially orthogonal to the axes of rotation of the counter-rotating impeller tubes. In other words, the belt run 37 nearest to the tubes is oriented substantially perpendicular to a plane containing the both axes 8,9 of the impeller tubes. In order to transmit power from the motion of the paddles to the tubes, a plurality of drive pins 50 extend substantially axially from the vertices at the end of each impeller tube. Thus the drive pins act as peripheral engagement structures which are repeatedly engaged and disengaged by the paddles of the drive mechanism during operation.

As shown in FIGS. 3-5, the paddles 35 repetitively and temporarily engage pairs of drive pins 50, one from each impeller tube, while they are adjacent to one another, and push them through the interface zone. In this embodiment each drive pin 50 includes an elongated shaft portion 51 connected at one end to an impeller tube vertex 52 and at the other end to an enlarged substantially spherically shaped terminus 53. The spherical shape allows for greater imprecision of the mechanisms and allows the drive pin to engage the paddle in a number of slightly different orientations. It should be noted that adequate clearance for passage of the drive pins is provided in the connection between the impeller tube axles 21 and the chassis 20.

FIG. 3 shows that the inwardly facing surface 41 of the drive belt 30 can be toothed in a manner similar to timing belts on many automobile engines and engaged by corresponding notches 42 on the drive mechanism gears 32 to facilitate synchronization between paddle and pin location during operation.

FIG. 4 shows the belt run 37 moving vertically 54. At one end of the belt run a pair 55 of pins come together to be driven by a paddle 56. At the opposite end of the run another pair 57 in pins separate to disengage from the drive belt 30.

FIG. 5 shows the drive pins engage a gap 58 between two adjacent paddles 35. This gap has a height H which is greater than a maximum vertical dimension of the pin 50 which is the diameter D of the terminus. The corners 59 of the paddles are beveled to avoid fouling of engaging or disengaging pins.

In this way, the impeller tubes 2,3 are counter-rotated in a direction which causes the upper part of the tubes to separate which displaces some of the ambient air above the center of the apparatus toward the apparatus thereby reducing its pressure. The same action causes the bottom part of the tubes to come together displacing the air located between the impeller tubes, this increasing the pressure of the ambient air below the apparatus. This air pressure differential caused by the action of the impellers causes lift and allows the apparatus to fly.

Referring now to FIG. 6, the collapse and expansion of the impeller tubes 2,3 will be described in greater detail. In general, the four-paneled impeller tubes change their shape by collapsing and expanding during each quarter rotation. The collapsing allows the spacing D between the impeller tube axes 8,9 to remain fixed. The constant axle spacing avoids vibration and reduces the bulkiness of the apparatus. In addition the overall width W of the pair of impellers remains essentially constant.

During each revolution, the cross-sectional shape of each tube 2,3 transforms successively from a substantially square shape as shown in section 3A, to a substantially diamond shape as shown in sections 3B and 3C, then back to a square shape. In other words, during a rotation of ⅛ of a revolution, each tube transforms from a square shape shown in section 3A, where substantially the entire surface of a panel 201 of a first tube 2 contacts substantially the entire surface of a panel 301 of the second tube 3, into a diamond shape shown in section 3B, where the vertex 220 between adjacent panels 201 and 202 of tube 2 contacts the corresponding vertex 320 of tube 3.

It should be appreciated that the cross-sectional shape of the transformable tube can be characterized as a parallelogram where opposite panels remain parallel to each other regardless of the tube's rotational orientation.

Because the tubes are generally quadrangular, and because the width remains constant the impeller apparatus can be particularly suited as a pumping device in quadrangular conduit such as industrial air conditioning ducts and mine shafts. Further, when implemented in a conduit, one or more baffle structures can be installed beyond the extent of the impeller tubes to restrict the flow of leakage currents on the impeller sides.

Figure 7:
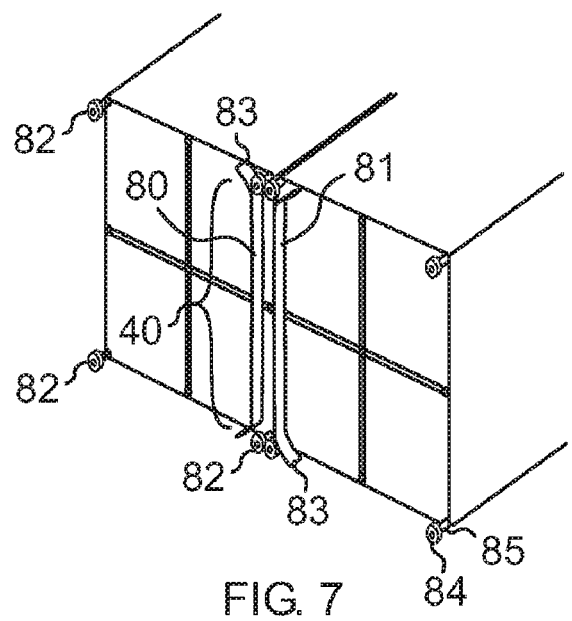
FIG. 7 is a diagrammatic perspective view an end of a fluid propelling apparatus showing a pair of drive pin guides straddling the interface zone of the two impellers.

As shown in FIG. 7, a pair of drive pin guides 80,81 straddle the interface zone 40 to help guides pins 82 from prematurely disengaging from the drive mechanism. The top and bottom of each guide forms a flare 83 to flare away form the interface zone to accommodate the coming together and separation of the pin pairs as they engage and disengage from the drive mechanism. In this embodiment each drive pin has a roller 84 formed onto the distal end of the pin shaft 85. The roller rotation axis is substantially in-line with the pin shaft elongation axis. The roller reduces wear on the paddle surfaces of the drive belt.

Figure 8:
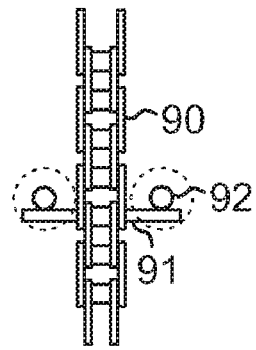
FIG. 8 is a diagrammatic end view of an alternate drive mechanism using a chain drive.

FIG. 8 shows an alternate embodiment where the drive belt has been replaced with a drive chain 90. Rather than paddles the drive chain is equipped with spaced apart engagement bars 91 which are oriented to contact the drive pin shafts 92 while pairs of drive pins are being engaged and driven by the drive mechanism.

Figure 9:
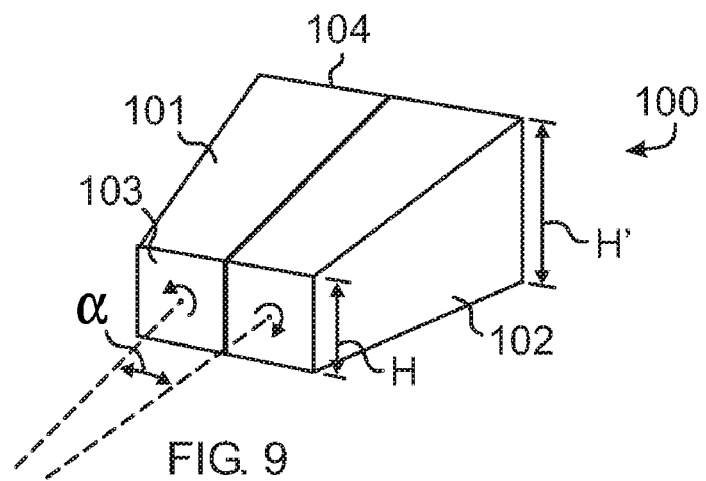
FIG. 9 is a diagrammatic perspective view of an alternate embodiment having impeller tubes having a truncated pyramid shape.

Referring now to FIG. 9, there is shown an alternate embodiment of the invention 100 in which both of the impeller tubes 101,102 are made to have a gradually tapered height and width to create a generally truncated pyramid or wedge shape. In this embodiment each tube has four panels and therefore forms a generally truncated pyramid shape. In other words, the front end 103 of a tube 101 has a substantially square cross-section having a given height dimension H. The opposite end 104 has a substantially square cross-section having a height H'. H increases linearly to H'. It has been found that the larger height is preferably between about a factor of 1.1 and 2.0 times the smaller height. It is believed that such a wedge shape oriented to have the smaller end placed at the front of an aircraft will provide for better gliding stability in the event there is a failure of the rotation drive mechanism during flight. It should be noted that the rotation axes of the two impeller tubes are coplanar but are not parallel, rather they diverge at a given acute angle $\alpha$.

Referring now to FIG. 10 there is shown an additional embodiment of the fluid propelling apparatus 401 which uses a vertically oriented drive screw 430 to drive a pair of counter-rotating collapsible/expandable impeller tubes 402,403 which rotate in a "separation-at-the-top" manner upon their respective axes 408,409 in a manner similar to that describe in the embodiment of FIG. 1.

A motor 412 direct drives a vertically oriented drive screw 430. The drive pins 450 of first tube 402 engage the drive screw and are driven vertically upward thus causing the tube to rotate in a counterclockwise manner as viewed from the near end. The same screw also successively engages the pins of the right hand tube 403 and drives them upward, thus causing the tube to rotate in a clockwise direction.

A lubricious coating of grease reduces mechanical wear of the drive screw and drive pins. Although not shown, a second drive screw can be used on the opposite end 434 of the tubes to provide balance and more power. Alternately, in a multi-screw apparatus, a given screw can be used to drive a single impeller tube. For added power, other screws located on either side of the apparatus can be driven in the opposite direction and engage the drive pins as they move substantially linearly downwardly along a side of the apparatus. When two or more screws are used, care should be taken to ensure proper syncronization between the drive screws.

FIG. 11 shows that the drive pins 550 can be offset a distance 551 from vertex axis 552 to allow for the screw pitch angle. In order that vertices of the two impellers meet up precisely, the drive pins on one or both of the impellers may need to be mounted on a swivel 553.

In addition, a screw can be used having two or more starts where the drive pin from on impeller tube engages the screw in one start and the drive pin of the other impeller tube engages the other start. In other words, the screw can be made to have at least two intertwined helical grooves. In this way the location of the drive pins in a pair can be adjusted to be more easily engaged into and disengaged from the drive screw.

The collapsible counter-rotating fluid propelling apparatus of the present invention as described herein is not limited for use in aircraft whether as a miniature flying devices, toys or large size transport vehicles, but can readily be extended to other applications such as, but not limited to, turbines for generating electricity, impellers for use on water craft such as boats, ships and submarines, as pumping devices, fans or compressors for use in for example vacuum cleaners, air conditioners, jet engines, and hydroturbines. Another significant use is in educational devices for teaching fluid dynamics, locomotion and the difficulty in obtaining efficiency in many mechanical systems.

It is further anticipated that placement of a fuel injection system and combustion initiation devices in the portion of the apparatus where panels are separating can transform the apparatus into an engine.

While the exemplary embodiments of the invention have been described, modifications can be made and other embodiments may be devised without departing from the spirit of the invention and the scope of the appended claims.

What is claimed is:

1. A fluid propelling apparatus which comprises:
    a pair of counter-rotating impeller bodies;
    wherein each of said bodies has an outer surface exposed to an amount of ambient fluid;
    wherein the outer surface of a first of said bodies remains in constant contact with the outer surface of the other of said bodies during a complete rotation cycle; and,
    wherein each of said bodies comprises a plurality of hingedly connected panels which allow each of said bodies to repeatedly collapse and expand during said cycle.

2. The apparatus of claim 1, wherein a first of said bodies rotates about a first axis; and, a second of said bodies rotates about a second axis fixedly spaced apart from said first axis.

3. The apparatus of claim 2, wherein said first axis and second axis are oriented to be substantially coplanar.

4. The apparatus of claim 3, wherein said first axis and second axis are oriented to be substantially parallel.

5. The apparatus of claim 1, wherein each of said bodies further comprises:
    a plurality of engagements connected thereto;
    wherein each of said plurality of engagements is positioned to releasably engage a drive mechanism.

6. The apparatus of claim 5, wherein each of said plurality of engagements comprises a drive pin.

7. The apparatus of claim 1, wherein each of said panels is substantially planar.

8. The apparatus of claim 7, wherein each of said panels is similarly shaped and dimensioned.

9. The apparatus of claim 1, wherein each of said bodies successively collapses and expands during a fraction of a revolution.

10. The apparatus of claim 9, wherein said fraction is 1 divided by the number of said panels.

11. The apparatus of claim 10, wherein each of said bodies comprises four panels and each of said bodies successively collapses and expands during ¼ of a revolution.

12. The apparatus of claim 1, wherein said outer surface comprises a coating layer of resiliently collapsible material.

13. A fluid propelling apparatus which comprises:
    a pair of counter-rotating impeller bodies;
    wherein each of said bodies has an outer surface exposed to an amount of ambient fluid;
    wherein the outer surface of a first of said bodies remains in constant contact with the outer surface of the other of said bodies during a complete rotation cycle; and,
    wherein each of said bodies comprises:
        a plurality of substantially planar panels;
        wherein each of said panels is hingedly connected to an adjacent one of said panels.

14. The apparatus of claim 13, wherein each of said bodies comprise four of said panels.

15. The apparatus of claim 13, wherein each of said bodies successively collapses and expands during a fraction of a revolution.

16. The apparatus of claim 15, wherein said fraction is 1 divided by the number of said panels.

17. The apparatus of claim 16, wherein each of said bodies comprises four panels and each of said bodies successively collapses and expands during ¼ of a revolution.

18. The apparatus of claim 13, wherein each of said panels is similarly shaped and dimensioned.

19. A fluid propelling apparatus which comprises:
    a pair of counter-rotating impeller bodies;
    wherein each of said bodies has an outer surface exposed to an amount of ambient fluid;
    wherein the outer surface of a first of said bodies remains in constant contact with the outer surface of the other of said bodies during a complete rotation cycle; and,
    wherein said outer surface comprises a coating layer of resiliently collapsible material.
    wherein each of said bodies comprises:
        a plurality of substantially planar panels;
        wherein each of said panels is hingedly connected to an adjacent one of said panels.

* * * * *